US012766354B2

(12) United States Patent
Friauf

(10) Patent No.: US 12,766,354 B2
(45) Date of Patent: Oct. 20, 2026

(54) FIRE EXTINGUISHER STAND

(71) Applicant: FES Solutions, LLC, Cedar Rapids, IA (US)

(72) Inventor: Scott Friauf, Cedar Rapids, IA (US)

(73) Assignee: FES SOLUTIONS, LLC, Cedar Rapids, IA (US)

( * ) Notice: Subject to any disclaimer, the term of this patent is extended or adjusted under 35 U.S.C. 154(b) by 296 days.

(21) Appl. No.: 18/433,700

(22) Filed: Feb. 6, 2024

(65) Prior Publication Data

US 2024/0366979 A1 Nov. 7, 2024

Related U.S. Application Data

(60) Provisional application No. 63/499,386, filed on May 1, 2023.

(51) Int. Cl.
*A62C 13/78* (2006.01)
*F16M 11/38* (2006.01)

(52) U.S. Cl.
CPC ............. *A62C 13/78* (2013.01); *F16M 11/38* (2013.01)

(58) Field of Classification Search
CPC ......... A62C 13/76; A62C 13/78; B01F 35/43; F16B 2/10; G09F 15/0062; F16M 11/24; F16M 11/242; F16M 11/245; F16M 11/39; F16M 11/38; A47B 23/001
USPC .................... 169/51, 52; D29/125, 129, 130; 248/136, 149, 150, 154, 346.3, 146, 460
See application file for complete search history.

(56) References Cited

U.S. PATENT DOCUMENTS

| | | | | | |
|---|---|---|---|---|---|
| 1,751,677 | A * | 3/1930 | Amstutz | A47B 65/10 | 108/179 |
| 2,941,582 | A * | 6/1960 | Tomat | A47C 4/04 | 108/115 |
| 3,139,205 | A * | 6/1964 | Haubrich | B65D 19/16 | 217/15 |
| 3,208,314 | A * | 9/1965 | Locke | A62C 13/76 | 81/436 |
| 3,783,855 | A * | 1/1974 | Newinger | A47J 37/0731 | 126/25 R |
| 4,253,260 | A | 3/1981 | Maza et al. | | |
| 4,787,460 | A | 11/1988 | Clarkson | | |
| 4,920,950 | A * | 5/1990 | Johnson | F24B 1/205 | 126/29 |
| 6,135,014 | A * | 10/2000 | Chang | A47J 37/0763 | 99/449 |

(Continued)

*Primary Examiner* — Jonathan Liu
*Assistant Examiner* — Guang H Guan
(74) *Attorney, Agent, or Firm* — SHUTTLEWORTH & INGERSOLL, PLC; Jason R. Sytsma

(57) ABSTRACT

A fire extinguisher stand has a first panel, a second panel, and a platform hinged at an intermediate portion of the first panel and at an intermediate portion of the second panel such that the first panel and the second panel are configured for moving between a first position with an upper end of the first panel and an upper end of the second panel proximate each other and a lower end of the first panel and a lower end of the second panel apart from each other; and a second position with the platform level and with the upper end of the first panel and the upper end of the second panel apart from each other and the lower end of the first panel and the lower end of the second panel pivoted towards each other for positioning the fire extinguisher stand in an upright position.

13 Claims, 7 Drawing Sheets

(56) References Cited

U.S. PATENT DOCUMENTS

| | | | | | |
|---|---|---|---|---|---|
| 6,464,184 | B1 * | 10/2002 | Lytle | B25B 11/00 248/154 |
| 7,708,242 | B1 * | 5/2010 | Petrashune | B44D 3/14 248/500 |
| 8,011,701 | B2 * | 9/2011 | Taylor | B44D 3/00 248/346.07 |
| 8,939,415 | B2 * | 1/2015 | Dillinger | F16M 13/02 248/237 |
| 9,211,847 | B1 * | 12/2015 | Cox | B60R 15/00 |
| 10,533,685 | B2 * | 1/2020 | Blundell | F16M 11/24 |
| D975,489 | S * | 1/2023 | Anderson | D7/332 |
| 12,233,296 | B1 * | 2/2025 | Lin | A62C 13/78 |
| 2024/0366979 | A1 * | 11/2024 | Friauf | A62C 13/78 |

* cited by examiner

FIRE EXTINGUISHER STAND

PRIORITY CLAIM

This application claims priority to U.S. provisional patent application No. 63/499,386 filed May 1, 2023 the contents of which are hereby incorporated by reference herein.

TECHNICAL FIELD

This disclosure relates to stands for holding a fire extinguisher, and, more specifically, this disclosure relates to a portable, collapsible fire extinguisher stand.

BACKGROUND INFORMATION

Hand-operated fire extinguishers are usually mounted on a wall surface in public places, such as the work-place, public thoroughfares, stairwells, as well as in open areas that might contain inflammable materials and thus contribute to the outbreak of fire. Such fire extinguishers are most usually mounted directly on a wall-surface or on a bracket of some kind which is itself mounted on a wall-surface, so that the fire extinguisher can be easily removed from the bracket used for its intended purpose and then eventually replaced with a substitute on the same wall-bracket.

On jobsites or in buildings under construction, however, fixed wall-surfaces are not always available or near enough for emergency use. OSHA, for example, requires all jobsites to have a fire extinguisher available on every floor for emergency use no further than 100 linear feet from any one point. This renders a fixed wall-hangers or other fixed supports untenable.

Accordingly, there is a need for a portable, collapsible fire extinguisher stand that is easy to transport and move around a jobsite that is convenient and easy to access in case of an emergency.

SUMMARY

Disclosed is a fire extinguisher stand for a fire extinguisher. The fire extinguisher stand also includes two panels and a platform hinged at an intermediate portion of each of the two panels such that the two panels are configured for moving between: a first position with an upper end of each of the two panels together and a lower end of each of the two panels apart, and a second position with the upper end of each of the two panels apart and the lower end of each of the two panels pivoted towards each other for positioning the stand in an upright position.

Implementations may include one or more of the following features. The stand where in the first position the two panels lie flat with each upper end positioned end to end with respect to each other. This allows for the stands to be stacked on top of each other for ease of carrying. The stand may include a carrying handle positioned at the lower end of each of the two handles. The two panels are held in the second position by placement of the fire extinguisher on the platform, so that the upper end of each of the two panels bears against the fire extinguisher. Removal of the fire extinguisher causes the two panels to collapse to the first position.

The platform may include a top surface with two upright sides on opposite ends of the top surface with the two uprights sides having a height substantially corresponding to a thickness of each of the two panels, so that in the first position the two panels lie flat with each upper end positioned end to end with respect to each other. The stand may include cooperating pivots and receiving holes to allow the panels to rotate with respect to the panel. In this regard, one of the pivots and or receiving holes can be formed on the panels and the other one of the pivots and receiving holes can be formed on the platform. In other words, the stand may include one part of a pivot and receiving hole at each end of the two upright sides and the other part of the pivot and receiving hole at the intermediate portion of each of the two panels so that when the respective pivots and receiving holes cooperate, the two panels pivot with respect to the platform.

The stand may include one part of a locking pin and a locking hole at an intermediate position at each end of the two upright sides and the other part of the locking pin and the locking hole on each side of the platform to lock the two panels in the first position. The two panels each may include a top wall at the upper end and extending between the two upright sides with a semi-circular cutout therein to correspond to a cylindrical shape of the fire extinguisher. The stand and may include a notch in the lower end of each of the two panels with a handle strap positioned therein.

The two panels each may include a front face and two side walls, where the intermediate portion of the two panels may include one part of a pivot and receiving hole that are engaged in the other part of the pivot and receiving hole on the platform. In the first position, the upper end of each of the two panels are together and the front face of the two panels face outward.

The one part of a pivot and receiving hole on the intermediate portion of the two panels further may include the receiving hole on the two side walls of each of the two panels, and the pivot formed on each corner of the platform. The two side walls of the two panels each may include one part of a locking pin and a locking hole that are engagable in the other part of the locking pin and the locking hole on the platform. The the combination of the locking pins and the locking holes hold the two panels in the first position. The one part of the locking pin and locking hole on the two panels further may include the locking pin on each of the two side walls of each panel that are engagable in the corresponding locking hole of the platform.

BRIEF DESCRIPTION OF THE DRAWINGS

These and other features and advantages of the present invention will be better understood by reading the following detailed description, taken together with the drawings wherein:

FIG. 8 shows a perspective, bottom view of the platform of FIG. 8.

DETAILED DESCRIPTION OF THE PREFERRED EMBODIMENTS

Figure 1:
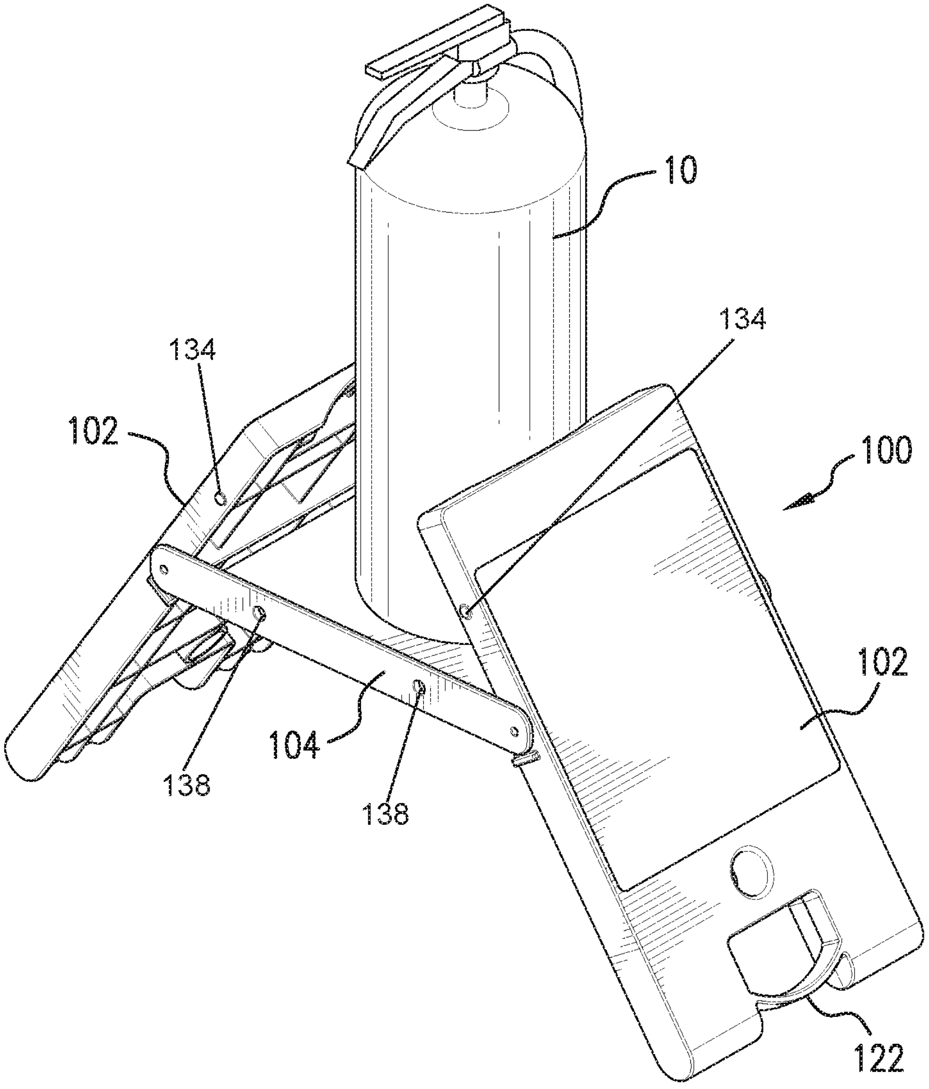
FIG. 1 is a perspective view of a fire extinguisher stand with a fire extinguisher according to this disclosure.
Figure 2:
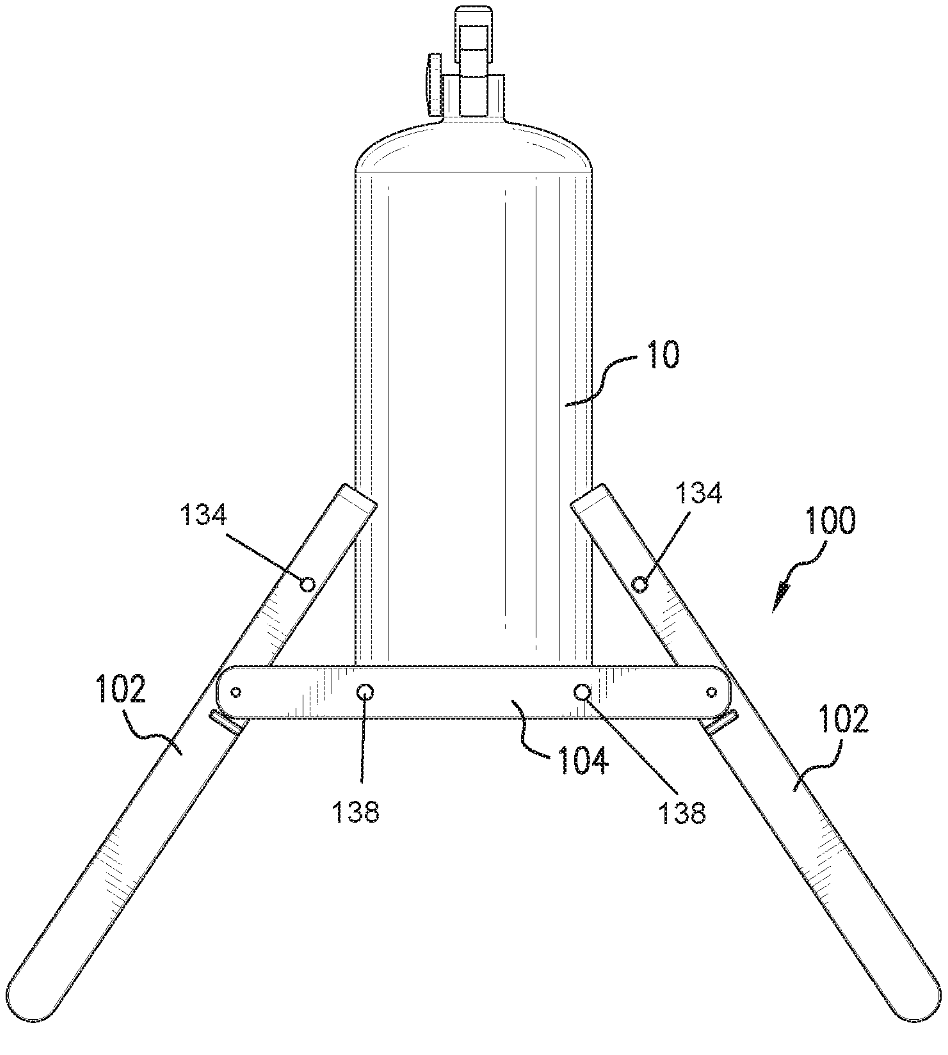
FIG. 2 is a side-view of the fire extinguisher stand of FIG. 1.
Figure 3:
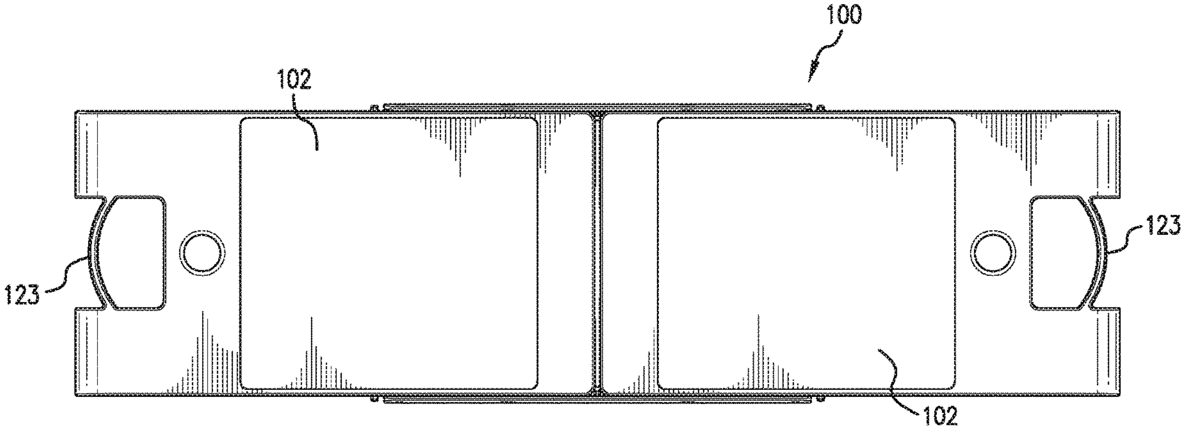
FIG. 3 is a top view of the fire extinguisher stand of FIG. 1 in a collapsed state.
Figure 4:
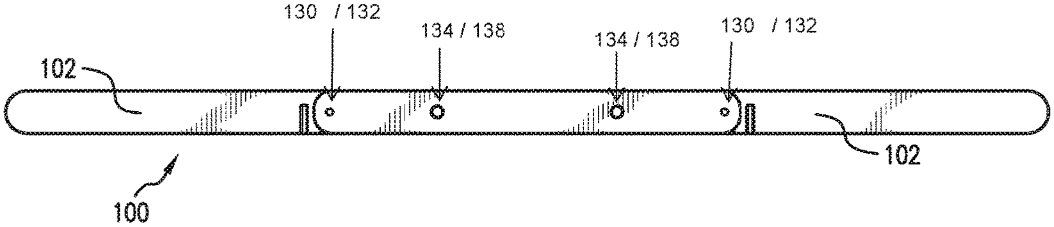
FIG. 4 is a side-view of the fire extinguisher stand shown in the collapsed state.

Referring to FIGS. 1-4 disclosed is a fire extinguisher stand 100 for holding a fire extinguisher 10 according to this disclosure. FIGS. 1 and 2 show fire extinguisher stand 100 in an upright position with a fire extinguisher 10 readily available for use. FIGS. 3 and 4 shows fire extinguisher stand 100 in a collapsed position without fire extinguisher 10. Generally, fire extinguisher stand 100 comprises of two panels 102 each pivotally joined on opposite sides to a platform 104 at a point that allows fire extinguisher stand 100 to fold flat, end-to-end, in the collapsed position. Each of the two panels 102 also has a semi-circular cutout 106 at its top to receive fire extinguisher 10. Taken together, this means that fire extinguisher stand 100 is not self-supporting but rather supported in its upright position with the placement of fire extinguisher 10 on top of platform 104.

Figure 5:
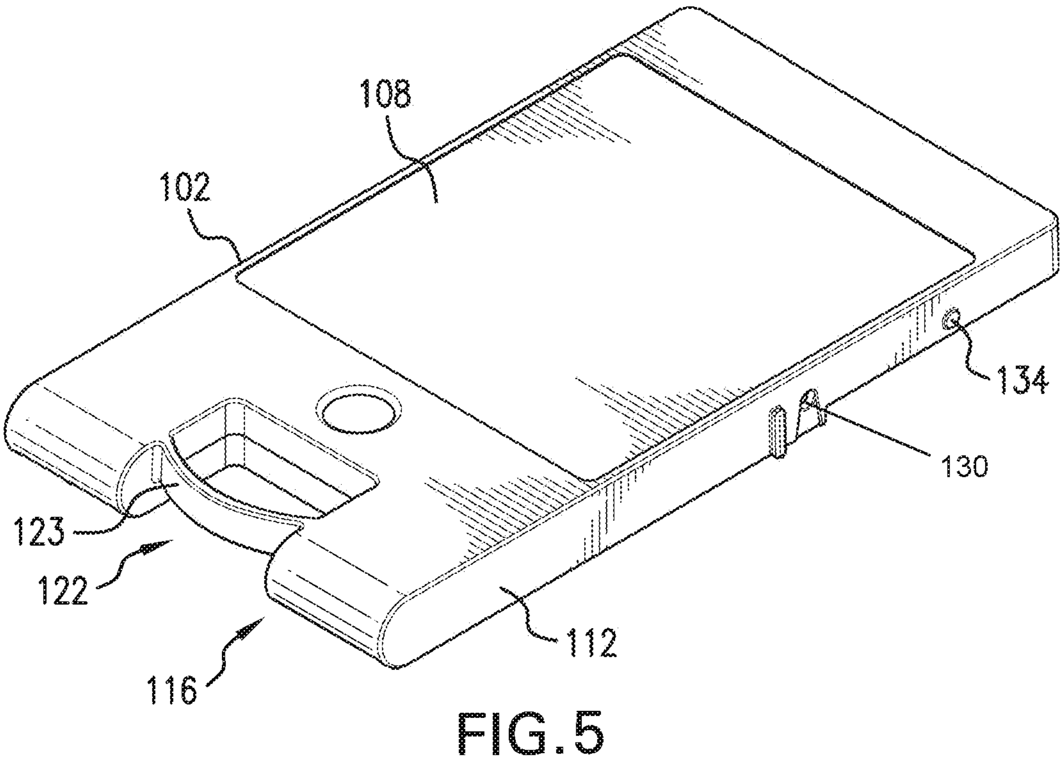
FIG. 5 is a perspective, front view of a panel of the fire extinguisher stand of FIG. 1.
Figure 6:
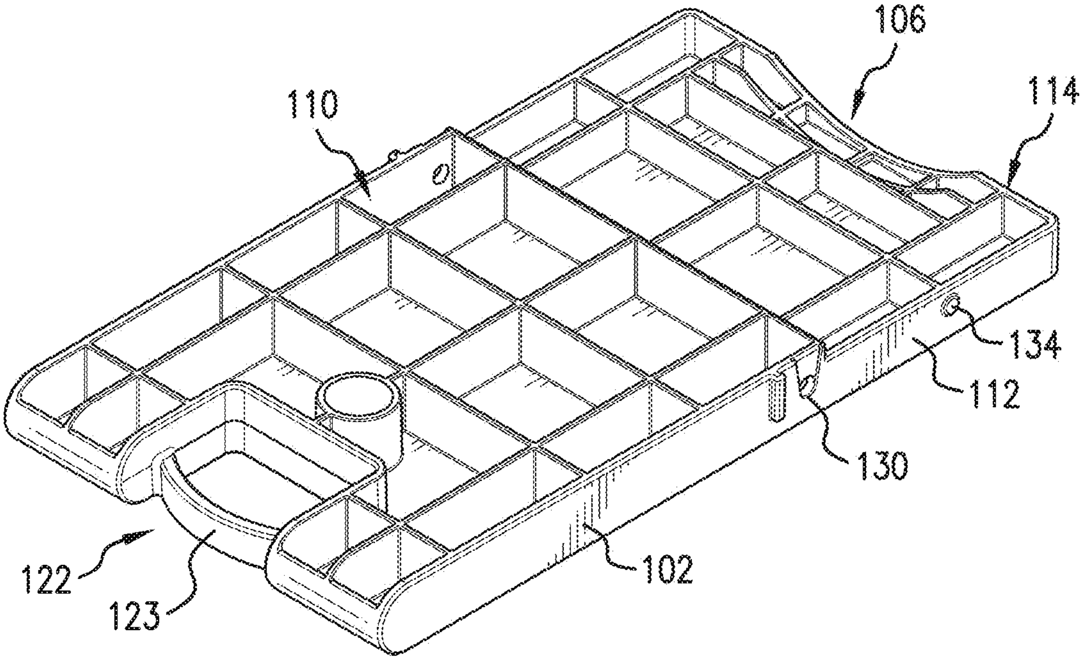
FIG. 6 is a perspective, back view of the panel of FIG. 5.
Figure 7:
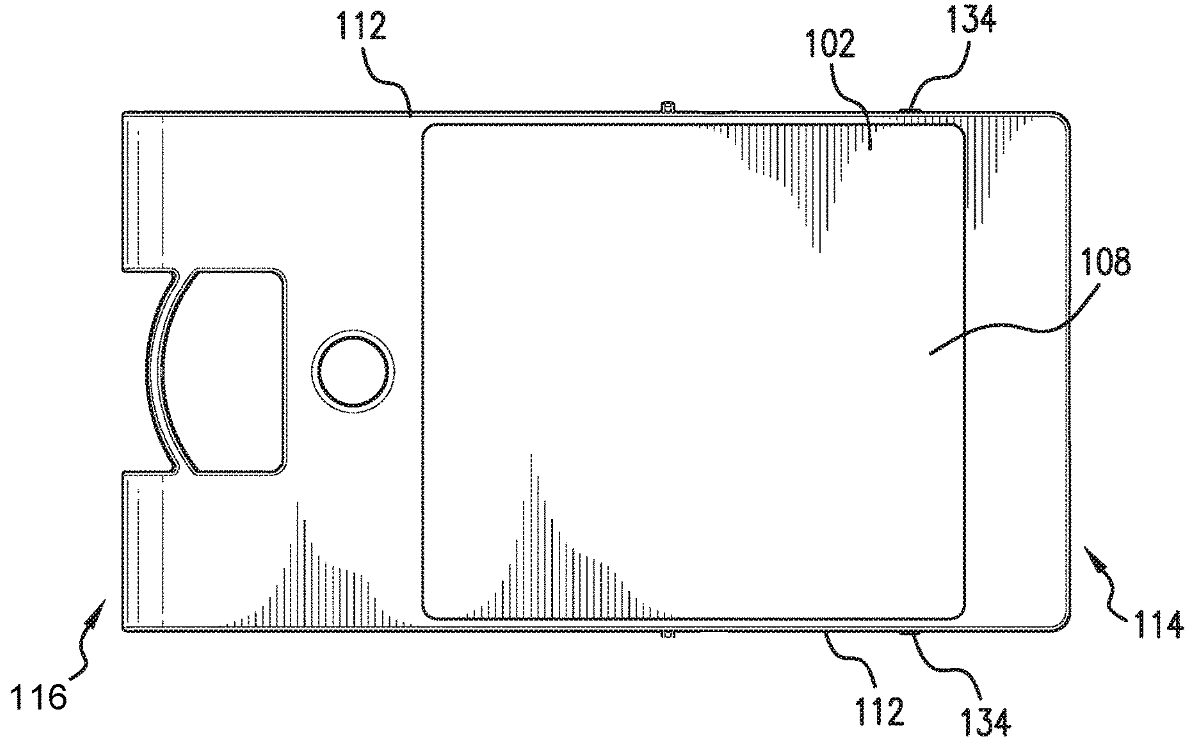
FIG. 7 is a top-view of the front of the panel of FIG. 5.

More specifically, turning to FIGS. 5-7, shown are each of two panels 102 which further comprise of a front surface 108, a honeycombed back surface 110, two sidewalls 112, a top surface 114, and a bottom surface 116. Front surface 108 can be made smooth and flat for signage. The honeycombed shape of back surface 110 provides structural support for each of two panels 102 while reducing the amount of material. Top surface 114 comprises of cutout 106 shaped generally to the circumference of fire extinguisher 10. Bottom surface 116 can comprise a chamfer across so that bottom surface 116 lays flat on the floor when upright. Bottom surface 116 can also comprise a v-shaped cutout or a notch 122 to form two leg-members on each of two panels 102. It should be understood that notch 122 with the two leg-members is not required for fire extinguisher stand 100 to stand upright. A handle strap 123 can be formed across the area of notch 122 for easy carrying.

Sidewalls 112 can be formed with one part of a cooperating pivot 132 and receiving hole 130 structure to attach platform 104 thereto. In the illustrated embodiment, the sidewalls 112 are formed with receiving hole 130 near an intermediate portion of each of two panels 102 so that platform 104 attaches intermediate between the top portions and the bottom portions of two panels 102 and can lay flat in the first position.

Sidewalls 112 can also be formed with one part of a cooperating locking pin 134 and locking hole 138 structure to lock two panels 102 to platform 104 in the first position. In the illustrated embodiment, sidewalls 112 are formed with locking pins 134 between intermediate portion and top portion of each of the two panels 102. In the first position, locking pins 134 mate with locking holes 138 formed in platform 104 to hold fire extinguisher stand 100 in the first position.

Figure 8:
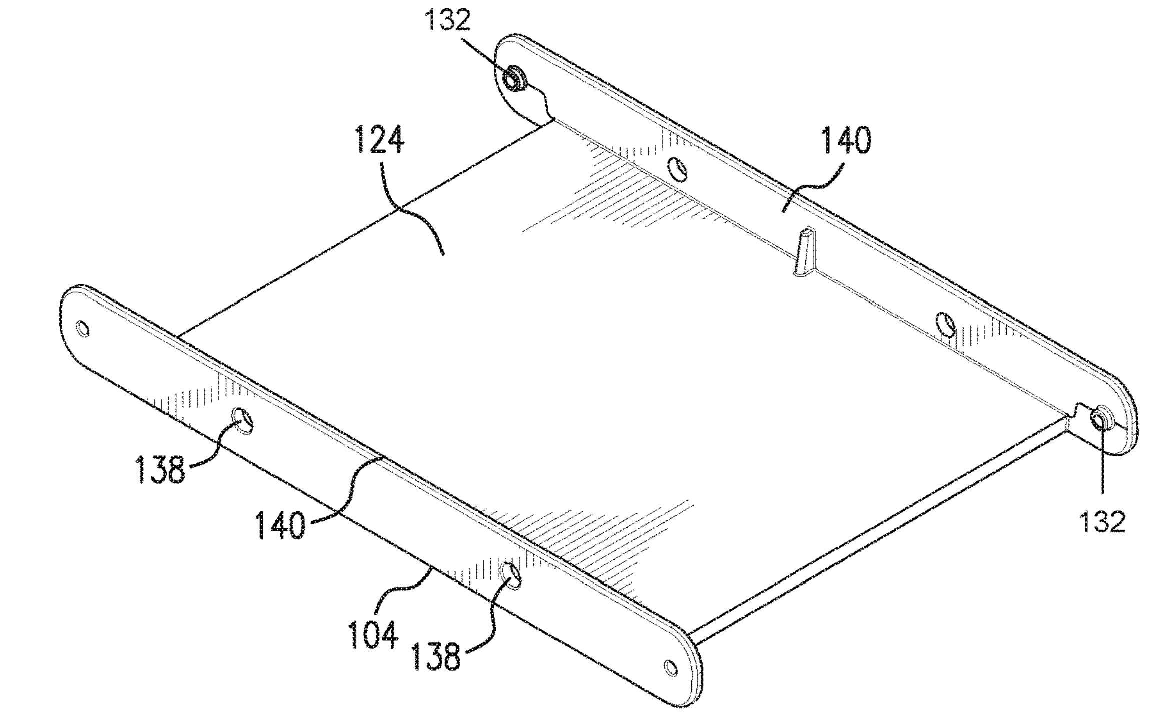
FIG. 8 shows a perspective, top view of the platform of FIG. 1.
Figure 9:
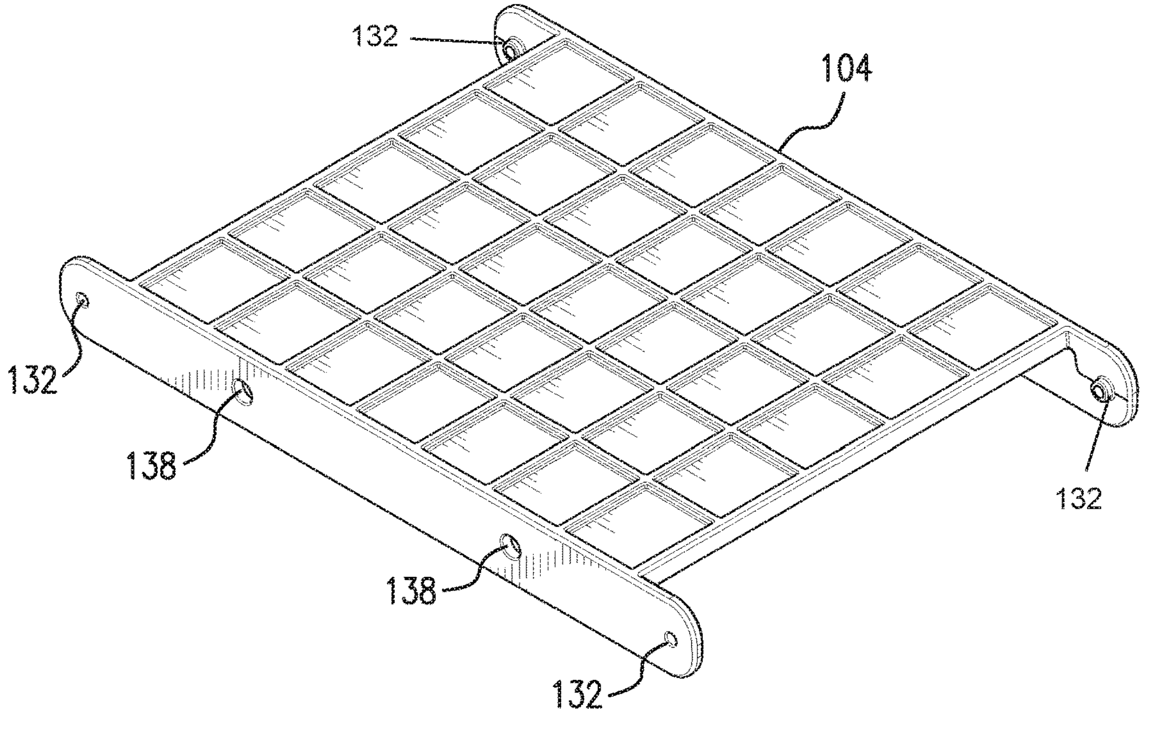
FIG. 9 is a close-up view of a portion of the bottom of the fire extinguisher stand of FIG. 5.
Figure 10:
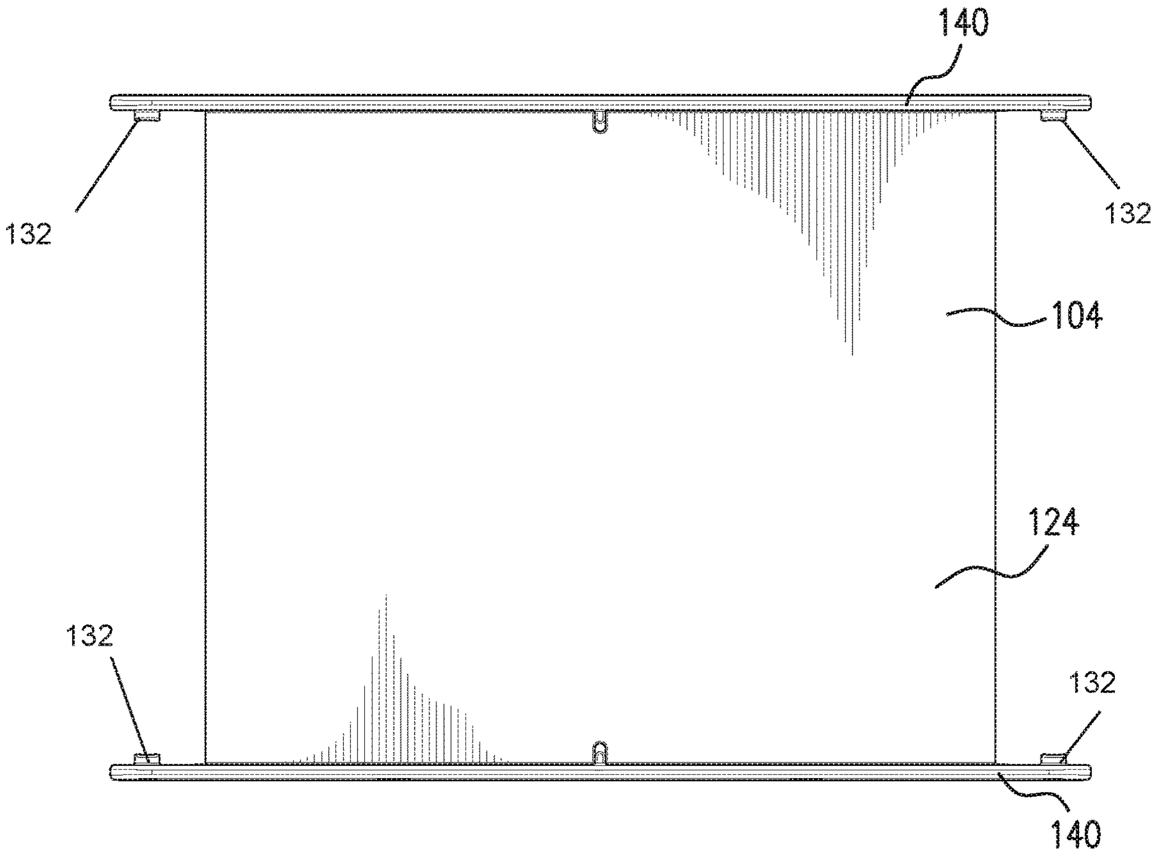
FIG. 10 is a top view of the panel of FIG. 8.
Figure 11:
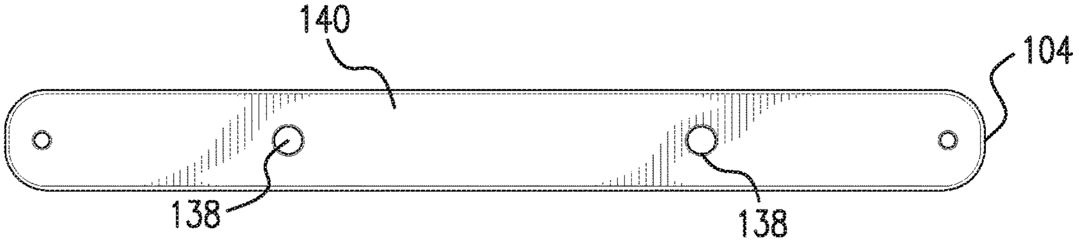
FIG. 11 is a side view of the panel of FIG. 8.

Turning to FIGS. 8-10, shown is platform 104, which comprises of a flat, top surface 124 to receive the bottom of fire extinguisher 10 so that it stands upright. Two upright sides 140 are positioned on opposite ends of top surface 124 with two uprights sides 140 having a height substantially corresponding to a thickness of each of two panels 102, so that in the first position two panels 102 lie flat with each upper end positioned end to end with respect to each other. One skilled in the art will understand that "substantially" is a term of degree not requiring precision, for example, to account for the thickness of top surface 124.

Each of two upright sides 140 further comprises the other part of the cooperating pivot 132 and receiving hole 130 structure to attach each of two panels 102 with platform 104. The illustrated embodiment shows four pivots 132 formed thereon for insertion into corresponding receiving holes 130 on two panels 102. One skilled in the art will recognize that the pivoting function can be formed in many ways, for example, instead of pivot being formed integral with either panels 102 or platform 104, it can be a separate cylinder press-fitted into cooperating receiving holes.

Each of two upright sides 140 further comprises the other part of the cooperating locking pins 134 and locking holes 138 that hold stand in the first position. The illustrated embodiment shows four locking holes 138 formed on two upright sides 140 to receive corresponding locking pins 134 formed on panels 102. When pressed to the first position, locking pins 134 engage locking holes 138 to hold the stand in the first position.

In operation, fire extinguisher stand 100 is stowable in a collapsed position, as shown in FIGS. 3-4. This allows for multiple stands to be stacked on top of each other for storage and transport. When picked up, fire extinguisher stand 100 is easily unlocked and moves to an extended position when each of two panels 102 pivoting with respect to platform 104. The operator, with its free hand, places fire extinguisher 10 on flat, top surface 124 of platform 104 and allows each of two panels 102 to pivot towards the center of platform 104 so that the respective semi-circular cutouts 106 touch against fire extinguisher 10, which allows the structure to stand in an upright position. When needed, the user simply grabs fire extinguisher 10 from fire extinguisher stand 100, which causes fire extinguisher stand 100 to collapse out of the way.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

I claim:

1. A fire extinguisher stand for a fire extinguisher, the fire extinguisher stand comprising:

a first panel;

a second panel;

a platform hinged at an intermediate portion of the first panel and at an intermediate portion of the second panel such that the first panel and the second panel are configured for moving between:

a first position with an upper end of the first panel and an upper end of the second panel proximate each other, and a lower end of the first panel and a lower end of the second panel positioned apart from each other; and a second position with the platform level and with the upper end of the first panel and the upper end of the second panel apart from each other and the lower end of the first panel and the lower end of the second panel pivoted towards each other for positioning the fire extinguisher stand in an upright position;

wherein the platform comprises a top surface and two upright sides on opposite ends of the top surface with the two upright sides having a height substantially corresponding to a thickness of each of the first panel and the second panel so that in the first position the first panel and the second panel lie flat between the two upright sides of the platform with the upper end of the first panel and the upper end of the second panel positioned end to end with respect to each other and flush with a top of the two upright sides; and wherein the first panel and the second panel are configured to be held in the second position by placement of the fire extinguisher on the platform so that the upper end of the first panel and the upper end of the second panel are configured to bear against the fire extinguisher.

2. The fire extinguisher stand of claim 1, further comprising a first carrying handle positioned at the lower end of the first panel and a second carrying handle positioned at the lower end of the second panel.

3. The fire extinguisher stand of claim 1, wherein in the second position, the first panel and the second panel are configured such that removal of the fire extinguisher from the platform causes the first panel and the second panel to collapse to the first position.

4. The fire extinguisher stand of claim 1, further comprising a first pivot attaching the platform to the first panel and a second pivot attaching the platform to the second panel so that the first panel and the second panel are configured to pivot with respect to the platform.

5. The fire extinguisher stand of claim 1, further comprising a first locking pin and a first locking hole to lock the first panel to the platform in the first position and a second locking pin and a second locking hole to lock the second panel to the platform in the first position.

6. The fire extinguisher stand of claim 1, wherein each of the first panel and the second panel comprises an outer surface and two side walls, wherein each of the two side walls of each of the first panel and the second panel comprises a first part of a respective pivot and receiving hole combination that is engaged with a second part of the respective pivot and receiving hole combination on the platform; and wherein in the first position the outer surface of the first panel and the outer surface of the second panel face a common direction.

7. The fire extinguisher stand of claim 6, wherein the first part of each pivot and receiving hole combination comprises a receiving hole positioned on a respective side wall of the two side walls of a respective one of the first panel and the second panel, and the second part of each pivot and receiving hole combination comprises a pivot formed on a respective corner of the platform.

8. The fire extinguisher stand of claim 6, wherein each of the two side walls of each of the first panel and the second panel comprises a first part of a respective locking pin and locking hole combination that is engageable with a second part of the respective locking pin and locking hole combination on the platform; and wherein each locking pin and locking hole combination is configured to hold a respective one of the first panel and the second panel in the first position.

9. The fire extinguisher stand of claim 8, wherein the first part of each locking pin and locking hole combination comprises a locking pin positioned on a respective side wall of the two side walls of the respective one of the first panel and the second panel and engageable with a respective locking hole positioned on the platform.

10. The fire extinguisher stand of claim 1, wherein each of the first panel and the second panel comprises a top surface at the upper end and extending between the two upright sides with a semi-circular cutout to correspond to a cylindrical shape of the fire extinguisher.

11. The fire extinguisher stand of claim 10, further comprising a first notch in the lower end of the first panel with a first handle strap positioned therein and a second notch in the lower end of the second panel with a second handle strap positioned therein.

12. An apparatus comprising:

a fire extinguisher; and a fire extinguisher stand comprising:

a first panel;

a second panel;

a platform hinged at an intermediate portion of the first panel and at an intermediate portion of the second panel such that the first panel and the second panel are configured for moving between:

a first position with an upper end of the first panel and an upper end of the second panel proximate each other, and a lower end of the first panel and a lower end of the second panel positioned apart from each other; and a second position with the platform level and with the upper end of the first panel and the upper end of the second panel apart from each other and the lower end of the first panel and the lower end of the second panel pivoted towards each other for positioning the fire extinguisher stand in an upright position;

wherein the platform comprises a top surface and two upright sides on opposite ends of the top surface with the two upright sides having a height substantially corresponding to a thickness of each of the first panel and the second panel so that in the first position the first panel and the second panel lie flat between the two upright sides of the platform with the upper end of the first panel and the upper end of the second panel positioned end to end with respect to each other and flush with a top of the two upright sides; and wherein the first panel and the second panel are held in the second position by placement of the fire extinguisher on the platform so that the upper end of the first panel and the upper end of the second panel bear against the fire extinguisher.

13. A method comprising:

providing a fire extinguisher;

providing a fire extinguisher stand comprising a first panel, a second panel, and a platform hinged at an intermediate portion of the first panel and at an intermediate portion of the second panel, wherein the platform comprises a top surface and two upright sides on opposite ends of the top surface with the two upright sides having a height substantially corresponding to a thickness of each of the first panel and the second panel;

moving the fire extinguisher stand to a first position with an upper end of the first panel and an upper end of the second panel proximate each other, and a lower end of the first panel and a lower end of the second panel positioned apart from each other, so that in the first position the first panel and the second panel lie flat between the two upright sides of the platform with the upper end of the first panel and the upper end of the second panel positioned end to end with respect to each other and flush with a top of the two upright sides;

positioning the fire extinguisher stand in an upright, second position with the platform level and with the upper end of the first panel and the upper end of the second panel apart from each other and the lower end of the first panel and the lower end of the second panel pivoted towards each other; and placing the fire extinguisher on the platform so that the upper end of the first panel and the upper end of the second panel bear against the fire extinguisher, thereby holding the first panel and the second panel in the upright, second position.

* * * * *